(12) United States Patent
Stephens

(10) Patent No.: US 7,707,012 B2
(45) Date of Patent: Apr. 27, 2010

(54) SIMULATED CITY GENERATION

(76) Inventor: Adrian Stephens, 3100 Ocean Park Blvd., Santa Monica, CA (US) 90405

( * ) Notice: Subject to any disclaimer, the term of this patent is extended or adjusted under 35 U.S.C. 154(b) by 865 days.

(21) Appl. No.: 10/850,455

(22) Filed: May 19, 2004

(65) Prior Publication Data

US 2004/0236543 A1 Nov. 25, 2004

Related U.S. Application Data

(60) Provisional application No. 60/472,702, filed on May 21, 2003.

(51) Int. Cl.
*G06F 17/50* (2006.01)
*G01C 21/34* (2006.01)
*G06F 7/00* (2006.01)
(52) U.S. Cl. .................. 703/2; 701/209; 707/104.1; 345/419; 340/995.11
(58) Field of Classification Search ............... 703/1, 703/2, 6; 701/207, 209; 345/419, 619; 358/1.1, 358/302, 471; 707/104.1; 340/995.11
See application file for complete search history.

(56) References Cited

U.S. PATENT DOCUMENTS 5,140,532 A * 8/1992 Beckwith et al. ............. 358/1.1
5,428,546 A * 6/1995 Shah et al. ................... 701/207
5,848,373 A * 12/1998 DeLorme et al. ............ 701/200
6,175,804 B1 * 1/2001 Szczerba ..................... 701/209
6,229,546 B1 * 5/2001 Lancaster et al. ........... 345/419
6,628,278 B1 * 9/2003 Ritter ......................... 345/419
6,654,690 B2 * 11/2003 Rahmes et al. ................. 702/5
7,076,505 B2 * 7/2006 Campbell ................ 707/104.1
2002/0161469 A1* 10/2002 Faulkner et al. ............. 700/118
2004/0008866 A1* 1/2004 Rhoads et al. ............... 382/100
2005/0182605 A1* 8/2005 Agrawala et al. .............. 703/2

* cited by examiner

*Primary Examiner*—Thai Phan
(74) *Attorney, Agent, or Firm*—Klein, O'Neill & Singh, LLP

(57) ABSTRACT

A city model generation process. A city model is generated using information about an actual city. A roadway database including segments of roadways is used to generate a city model having grid points corresponding to intersections between the roadway segments. A type of roadway determined from the roadway database information is associated with sets of grid points defining a single roadway. Elevation data is added to the city model using a topographic database. Features, such as a road profile, are added to the roadway using the type. Photographic and zoning information is used to further refine the type of a roadway with a subtype corresponding to features of buildings that may be associated with the roadway. Generic building models and features are associated with the roadways based on the subtypes. Landmark building models are added to the city model to complete the city model.

13 Claims, 15 Drawing Sheets

SIMULATED CITY GENERATION

CROSS-REFERENCE TO RELATED APPLICATION(S)

This application claims the benefit of U.S. Provisional Patent Application No. 60/472,702, filed May 21, 2003, which is hereby incorporated by reference as if set forth in full herein.

BACKGROUND OF THE INVENTION

This invention pertains generally to the generation of models of physical objects for display by a data processing system and more specifically to generating a computer model of an actual city for use in generating a cityscape of the city.

A mathematical representation, or model, of a physical object is often very useful. Such models can be used to simulate actions or relating to the physical object. This is particularly helpful when the actions, if actually performed, would damage the actual physical object, or if the physical object is unavailable for the proposed actions.

One type of model is a three dimensional image of a physical object. Such models are used to generate views of the physical object for display by a data processing system. Such models may be used instead of digitized photographs or other more immediate representations of the actual physical object for a variety of reasons. One reason is that models can be used to generate a view of a physical object from different viewing location or under any lighting condition. This ability is useful in, for example, video games. In video games a person playing the game often virtually moves through a simulated physical environment, with the person's virtual position within the environment changeable with respect to objects in the environment and the environment as a whole. As the person moves through the simulated environment, portions of the model may be retrieved by the video game and used to generate a view of the environment that corresponds to the person's position and view point in the city. This creates an illusion that the person is actually in the in the environment depicted by the model.

Simulated environments may be developed by software developers or artists who create each element or object in the model manually. While this method may result in a detailed model capable of being used to generate detailed and realistic views of an environment, the method is time consuming. Alternatively, systems for creating environments may rely on automatically generating features within an environment by automated rules. While these rule-based systems may be able to rapidly generate a model, the resulting model may lack the detail and randomness that give the impression that the model is a representation of an actual environment. In addition, both types of systems fail in modeling an environment of an complexity, such as an actual city. The manual systems or simply too laborious for an artist or software developer to use in creating a detailed model of an actual city and the rules used in rule-based systems are simply incapable of capturing the complexity of an actual city.

SUMMARY OF THE INVENTION

In one aspect of the invention, a simulated city model is generated using information about an actual city. A roadway database including segments of roadways is used to generate a city model having grid points in a single plane corresponding to intersections between the roadway segments. The grid points may be augmented with control points to generate Bezier splines to represent curves in a roadway. A type of roadway determined from the roadway database information is associated with sets of grid points defining a single roadway. Features, such as a road profile, are added to the roadway using the type. Photographic information is used to further refine the type of a roadway with a subtype corresponding to features of buildings that may be associated with the roadway. Elevation data is added to the city model using a topographic database. Generic building and feature models are associated with the roadways in the city model based on the subtype determined for a roadway. Landmark building models are added to the city model to complete the city model. The completed city model may then be used in a variety of applications such as video games or virtual maps to simulate the actual city whose information was used to generate the simulated city.

In another aspect of the invention, a city model generator receives a set of roadway segments that correspond to a plurality of roadways of an actual city. The city model generator generates a set of grid points using the set of roadway segments with each grid points corresponding to an intersection between two roadway segments. The city model generator receives topographic city information and associates elevation values to the grid points using the topographic data.

To further refine the city model, the city model generator associates a type to a subset of the set of grid points wherein the subset corresponds to a roadway from the plurality of roadways and associates a road profile to the subset of grid points using the type. The model is further refined when the city model generator associates a subtype to the subset of grid points. The city model generator may then associate feature models to the subset of grid points using the subtype.

In another aspect of the invention, the city model generator associates a subtype to a roadway using a photograph of a portion of the city corresponding to an area through which the roadway passes. The city model generator may also use zoning information to associate the subtype to the roadway.

In another aspect of the invention, the city model generator associates a model of a landmark to the of grid points.

BRIEF DESCRIPTION OF THE DRAWINGS

These and other features and aspects of the present invention are more fully understood when considered with respect to the following detailed description, appended claims, and accompanying drawings, wherein:

DETAILED DESCRIPTION

Figure 1A:
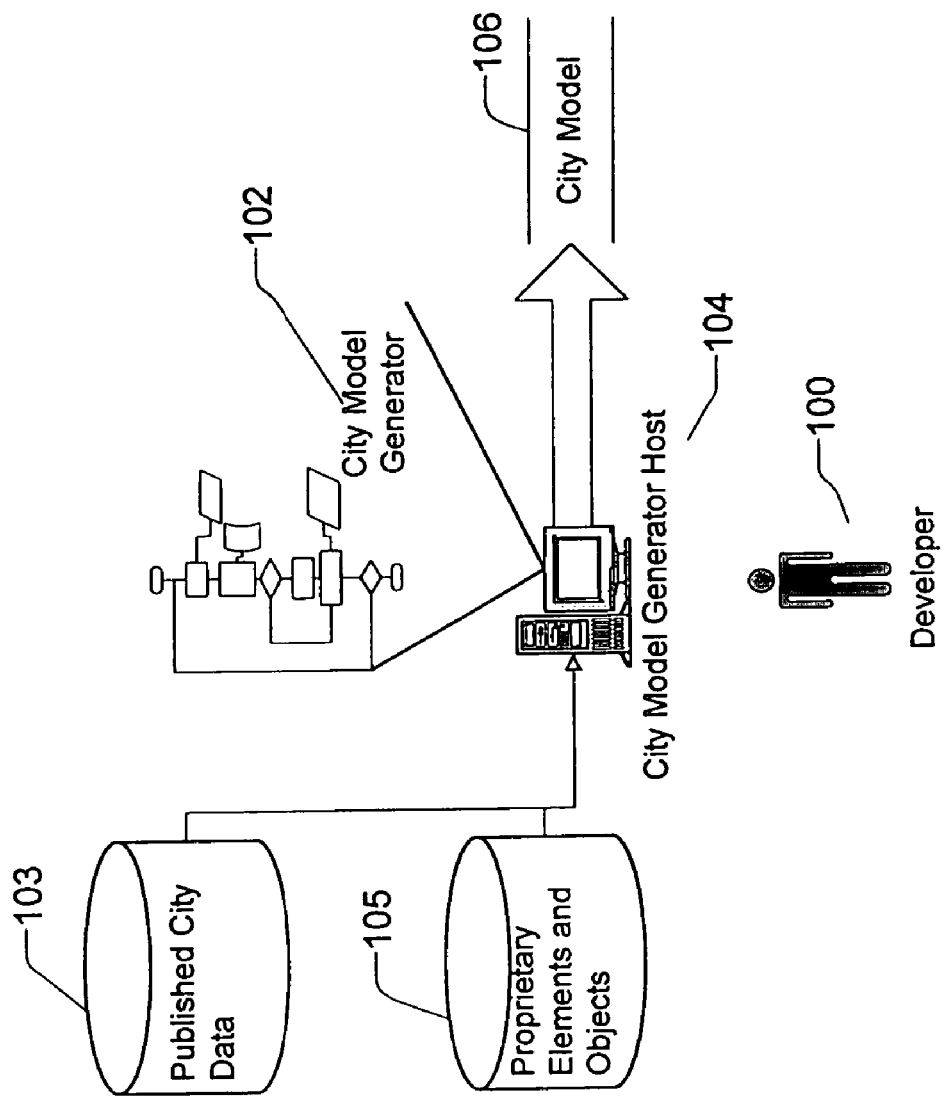
FIG. 1a is a block diagram of a simulated city model generation process in accordance with an exemplary embodiment of the present invention.

FIG. 1a is a block diagram of a simulated city model generation process in accordance with an exemplary embodiment of the present invention. A software application developer 100 uses a city model generator 102 hosted by a city model generator host 104 to generate a simulated city in the form of a city model 106.

The city model is generated using published and available data 103 about an actual city and proprietary elements and objects 105 provided by the software application developer. The published city data may include data about roadways that pass through the actual city, topographic data, zoning data, and ariel photographs of the city. The proprietary data represents elements and objects that might be found in a city. For example, the proprietary data may include a plurality of models of generic buildings, such as commercial and residential buildings, that may be placed in the city model according to a set of rules. In addition to the generic building models, the proprietary data may also include models of landmark buildings or locations within the actual city being modeled.

In an exemplary city generation process used by a city generator, the roadway data is used to generate a set of grid points describing the broad layout of the city as might be viewed using a two dimensional map. Elevation data is added to the model using the topographic data. Generic building and location details are added to the model using the zoning and photographic data to determine where the generic elements should be added in the city model. To add additional detail, the models describing landmark locations or buildings are added to the city model resulting in a completed model of the actual city.

Figure 1B:
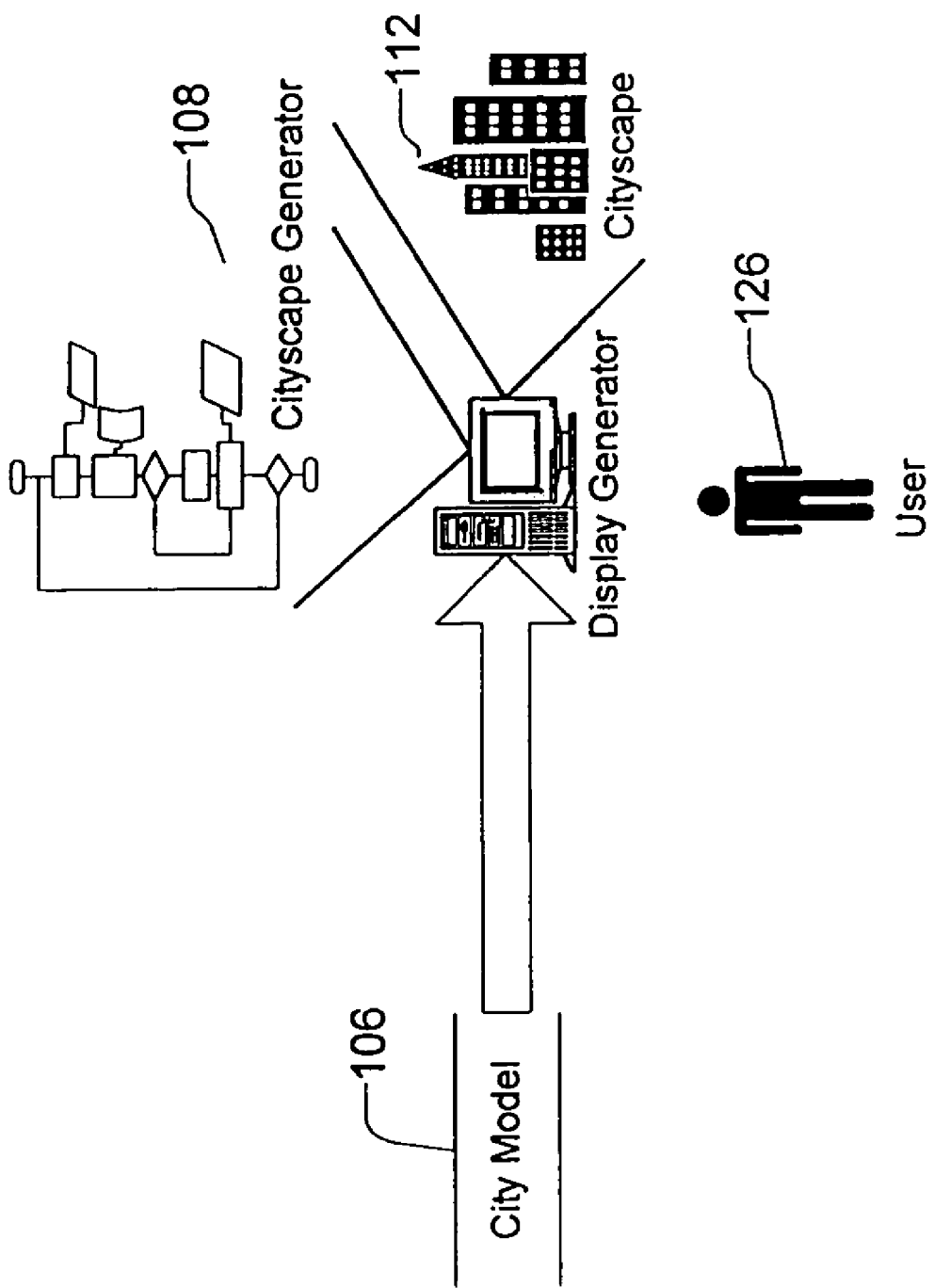
FIG. 1b is a block diagram of a simulated city model use process in accordance with an exemplary embodiment of the present invention.

FIG. 1b is a block diagram of a simulated city model use process in accordance with an exemplary embodiment of the present invention. As an exemplary use, the city model is used by a cityscape generator 108 hosted by a cityscape generator host 110 to generate a cityscape 112 in response to user inputs received from a user 114.

In one embodiment of a cityscape generator in accordance with an embodiment of the present invention, the cityscape generator is included in a video game software application. In this embodiment, the user plays a video game that includes a city as a play area. As the city generator can be used to create a city model from data associated with an actual city, the city model may be used to generate cityscapes that realistically replicate the actual city. This enhances the user's perception that they are actually in the city represented in the city model.

In another embodiment of a cityscape generator, the cityscape generator is included in a map software application. In this application, The map software application is used by the user to take a self-guided "virtual tour" of the city modeled by the city model.

Figure 2:
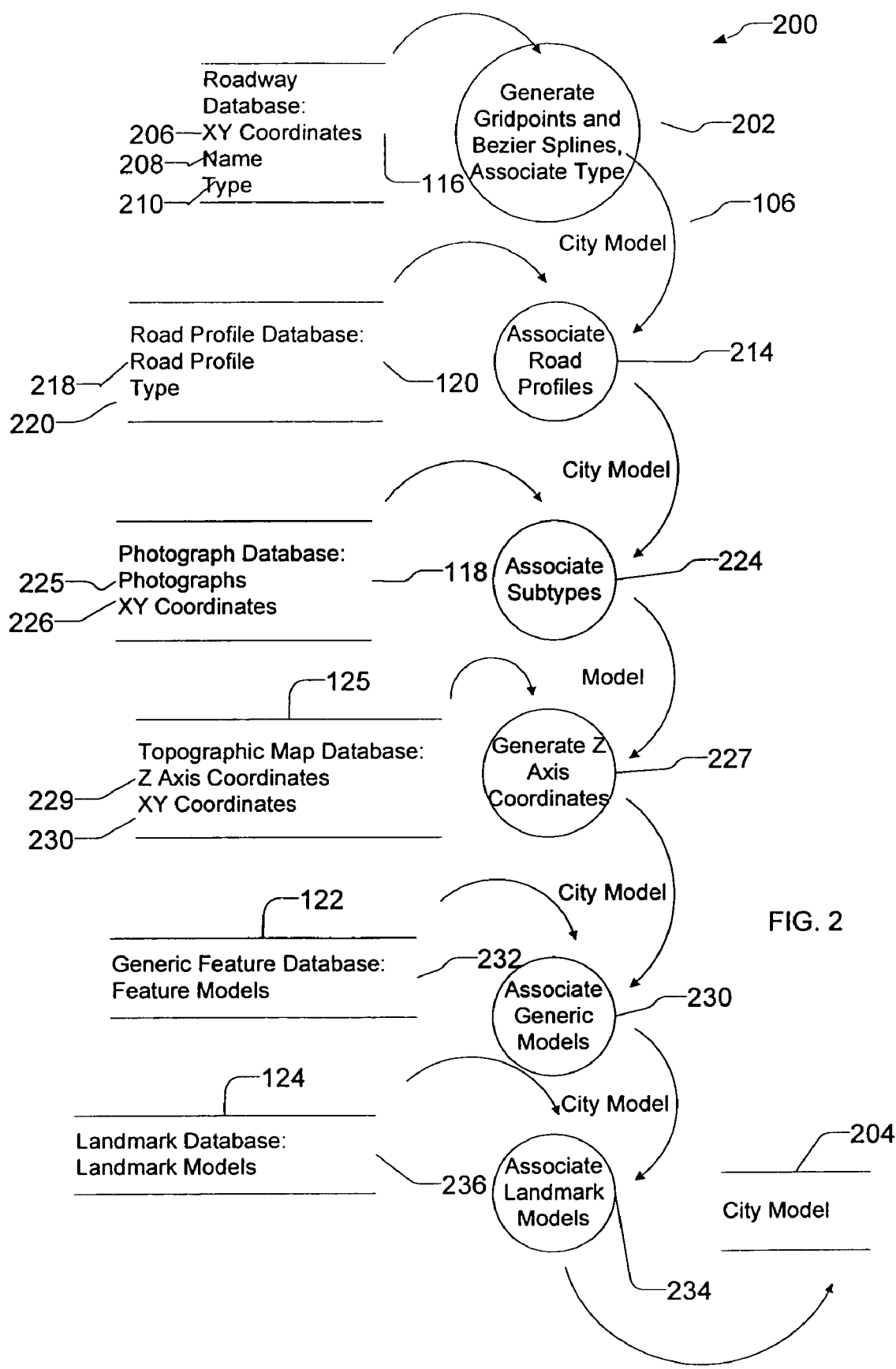
FIG. 2 is a data flow diagram of a city model generation process in accordance with an exemplary embodiment of the present invention.

FIG. 2 is a data flow diagram of a city model generation process in accordance with an exemplary embodiment of the present invention. The city generation process 200 uses a roadway database 116 including descriptions of roadways in the form of X axis and Y axis coordinates describing segments of the roadways to generate (202) a city model 106. Included in the roadway database and associated with each roadway are a plurality of XY coordinates 206 specifying endpoints for the roadway segments, names 208 associated with the roadways and a roadway type 210 associated with each roadway. The types of the roadways are descriptions of the general type of the roadway. For example, a "street" type may specify a two lane roadway such as might be found in a residential neighborhood, a "boulevard" type may specify a wider two-lane or four-lane roadway through a picturesque neighborhood, a "road" type may specify a narrow two-lane or even one-lane roadway through a rural area, etc.

Figure 3A:
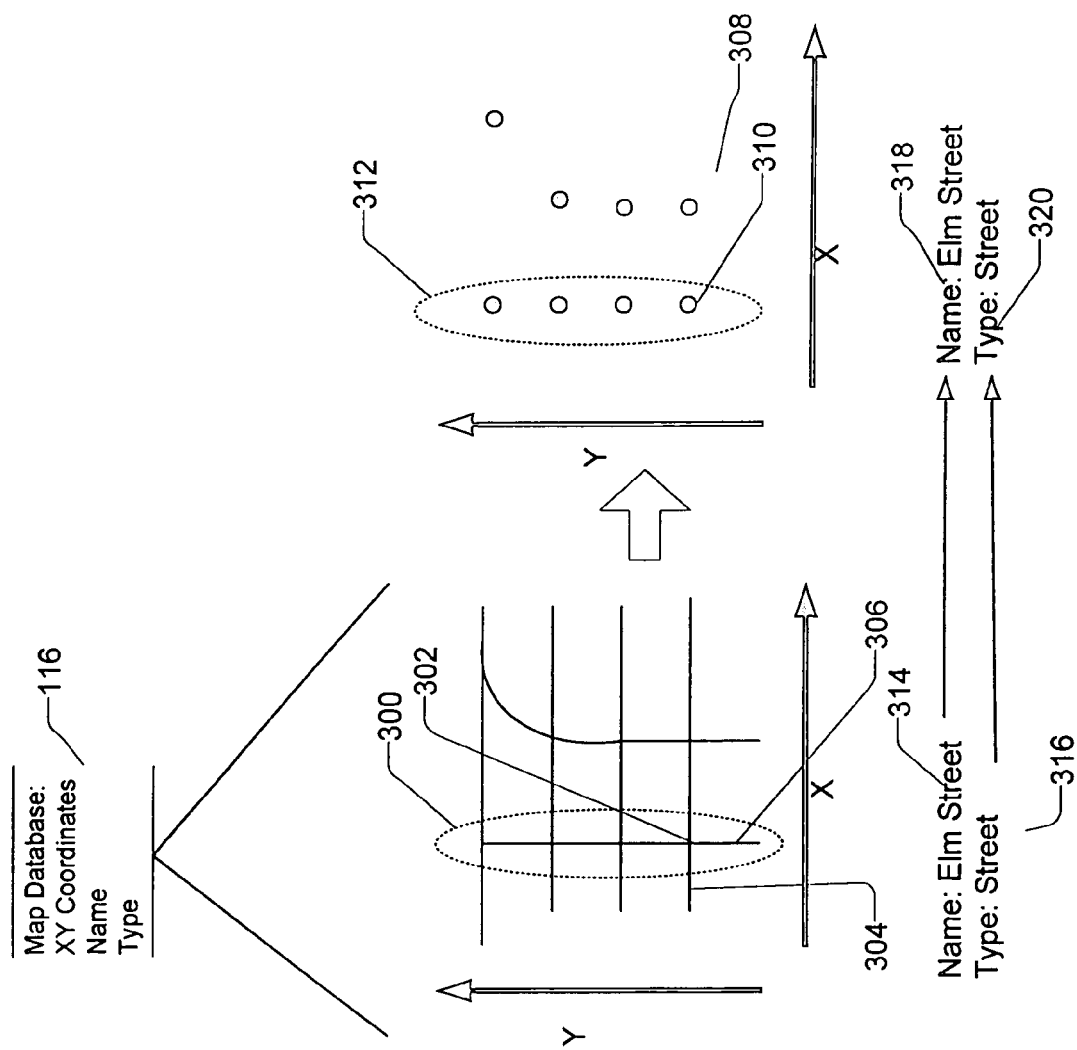
FIG. 3a is block diagram of a grid point generation process in accordance with an exemplary embodiment of the present invention.

FIG. 3a is block diagram of a grid point generation process in accordance with an exemplary embodiment of the present invention. A roadway database 116 includes a description of a roadway, such as roadway 300, in the form of X axis and Y axis coordinates describing segments of the roadway. A city model 106 is generated by determining intersections, such as intersection 302, between pairs of roadway segments, such as roadway segments 304 and 306, in the roadway database. By repeating the process for all of the roadways, this determination of intersections generates a set of XY grid points 308, with each grid point representing a roadway intersection. For example, grid point 310 represents intersection 302. Each roadway in the roadway database is then represented by a subset of grid points, such as subset 312, in the city model. As such, the city model is a projection of all the intersections of the actual city as grid points on a plane defined by the X and Y axes.

Also included in the roadway database are one or more names, such as name 314, and a type, such as type 316, associated with each roadway. The name and type are also associated, such as name 318 and type 320, by the city generation process to the set of grid points representing the roadway in the city model.

Figure 3B:
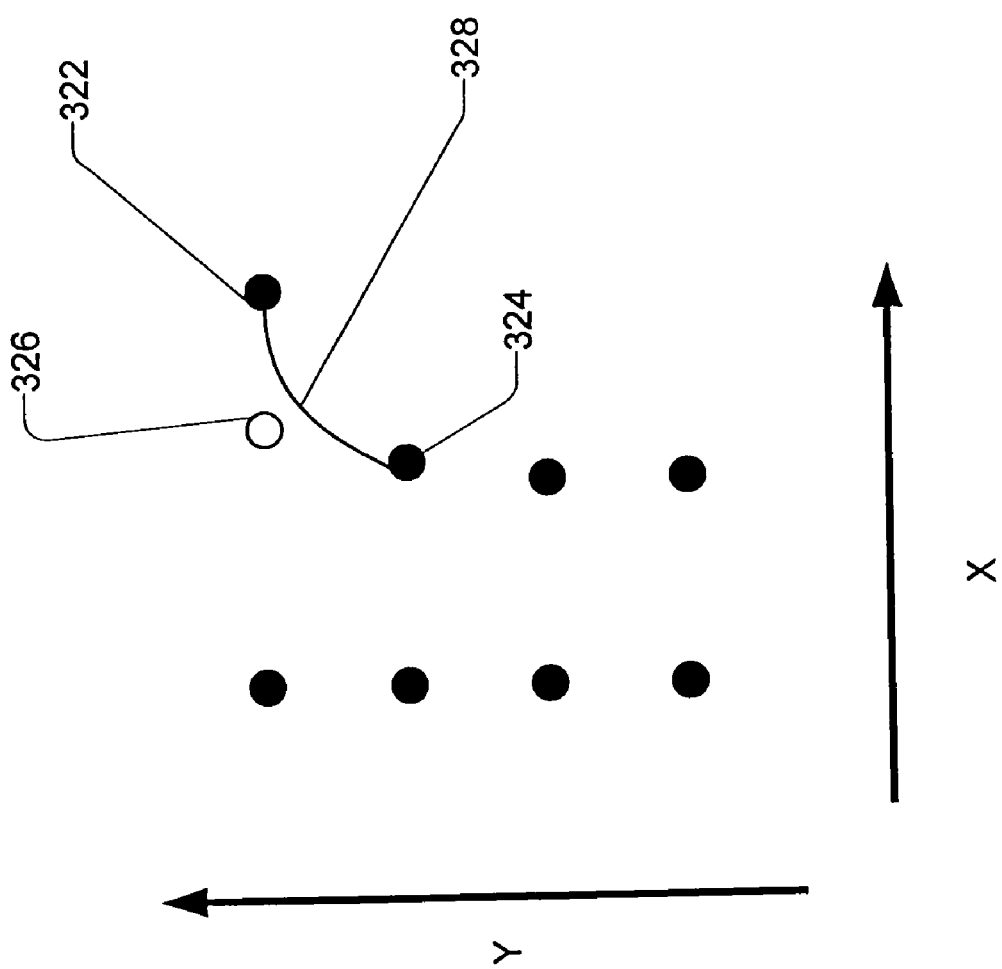
FIG. 3b is block diagram of a Bezier spline control point addition process in accordance with an exemplary embodiment of the present invention.

FIG. 3b is block diagram of a Bezier spline control point addition process in accordance with an exemplary embodiment of the present invention. In one city model in accordance with aspects of the present invention, Bezier splines, such as Bezier spline 321, are used to define the line segments or edges extending between the grid points. For example, grid point 322 and grid point 324 may be used along with control point 326 to define a Bezier spline 328. The Bezier spline may then be used to represent the segment of roadway between grid point 322 and grid point 324. To do so, control points, such as control point 322, are added to the grid points in order to define Bezier splines. In this way, roadways with curved segments can be readily and efficiently modeled.

Referring again to FIG. 2, the city generation process uses a road profile database 120 along with the city model 106 to generate (214) a city model including road profiles associated with each roadway described in the city model. The road profile database includes road profiles 218 associated with types 220.

Figure 4A:
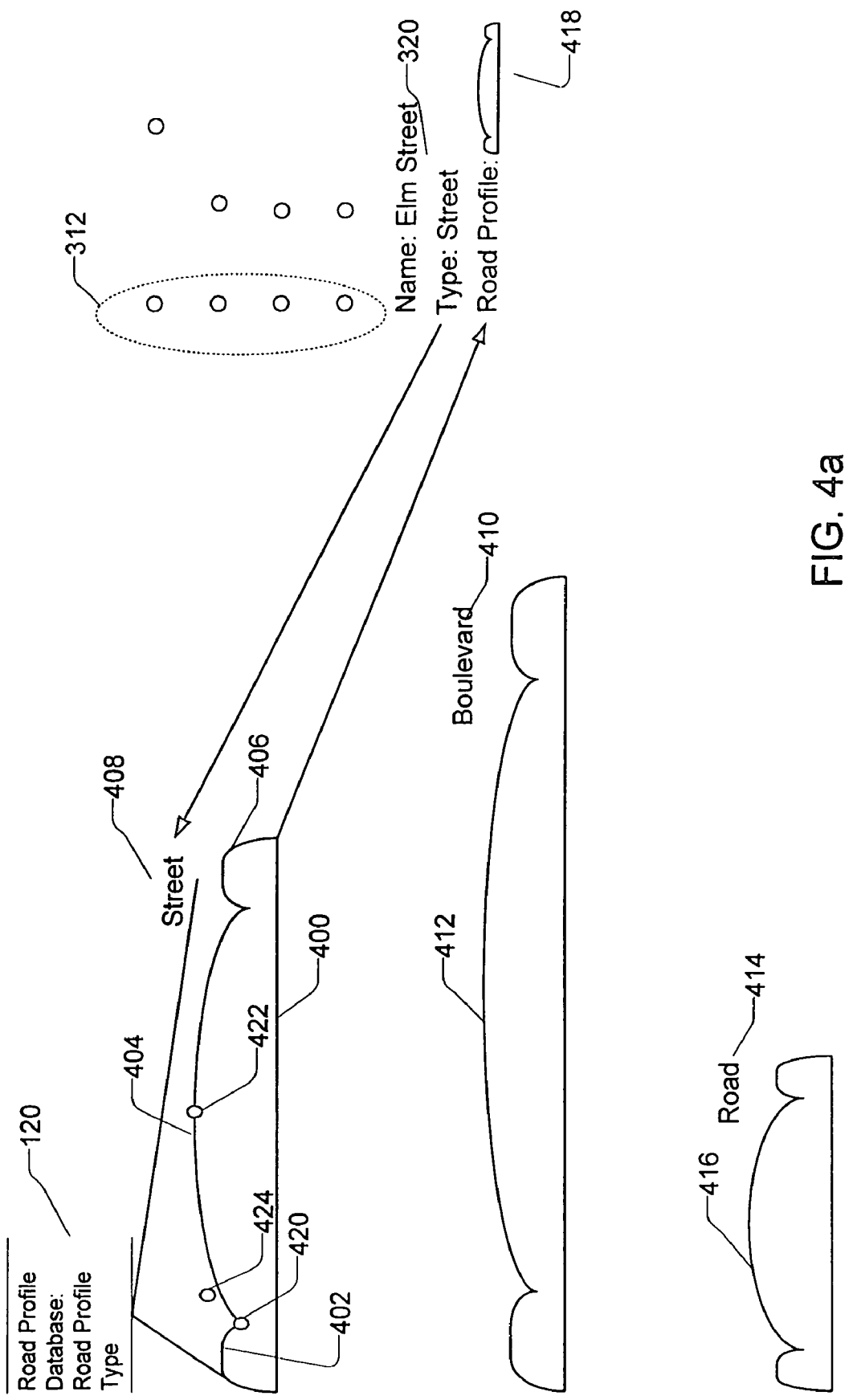
FIG. 4a is a block diagram of a road profile association process in accordance with an exemplary embodiment of the present invention.

FIG. 4*a* is a block diagram of a road profile association process in accordance with an exemplary embodiment of the present invention. A road profile, such as road profile 400, is a mathematical description of a pavement layer over a roadbed for a roadway. Specifically, the road profile is described as set of Bezier splines defining a first curb portion 402, a lane portion 404 being generally arched upwards and a second curb portion 406. Each road profile in the road profile database is associated with a type, such as type 408. The type conveys the nature of the road profile. For example, a "street" type is associated with road profile 400 describing a small two-lane roadway, a "boulevard" road type 410 is associated with a road profile 412 describing a broad two-lane or four-lane roadway, a "road" type 414 is associated with a road profile 416 describing a narrow two-lane or one-lane roadway, etc. As a type 320 is associated with a set of grid points and control points 312 describing a roadway, the city model generation process can also associate a road profile 418 to the roadway.

Figure 4B:
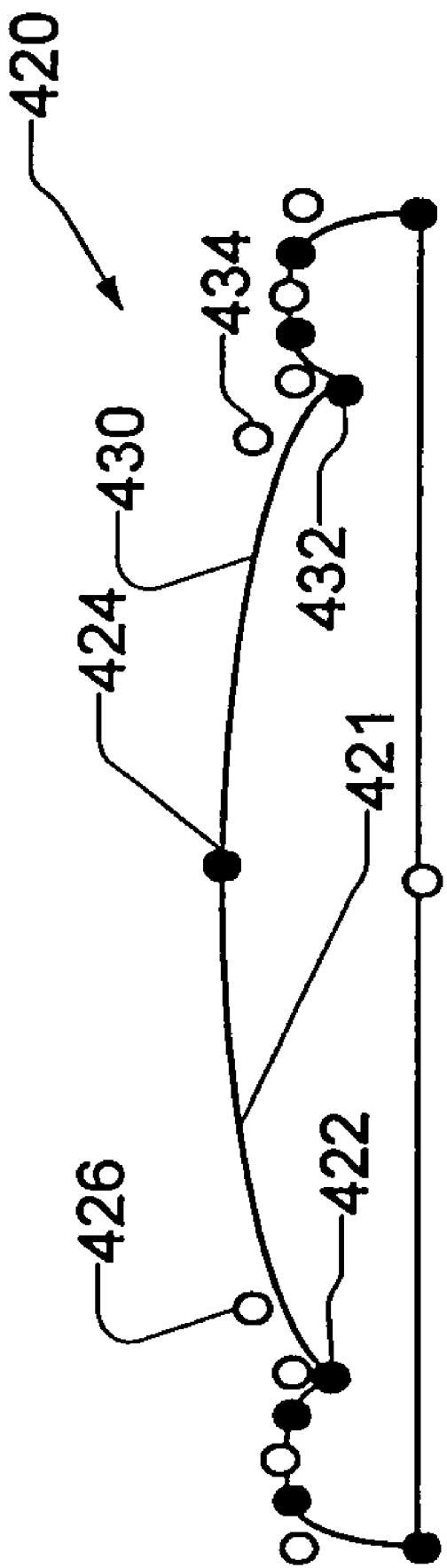
FIG. 4b is a diagram of a road profile defined by Bezier splines in accordance with an exemplary embodiment of the present invention.

FIG. 4*b* is a diagram of a road profile defined by Bezier splines in accordance with an exemplary embodiment of the present invention. A road profile 420 may be defined using a set of Bezier splines, such as Bezier spline 421. Each Bezier spline is defined using a control point and two end points. For example, Bezier spline 421 is defined by end point 422 and end point 424 along with control point 426. Portions of the road profile may then be specified using Bezier splines joined at shared endpoints. For example, Bezier spline 421 is joined to Bezier spline 430 by sharing a common end point 424. Bezier spline 430 is further defined by end point 432 and control point 434. In this way, a road profile may be defined using any number of Bezier splines joined at end points.

Figure 4C:
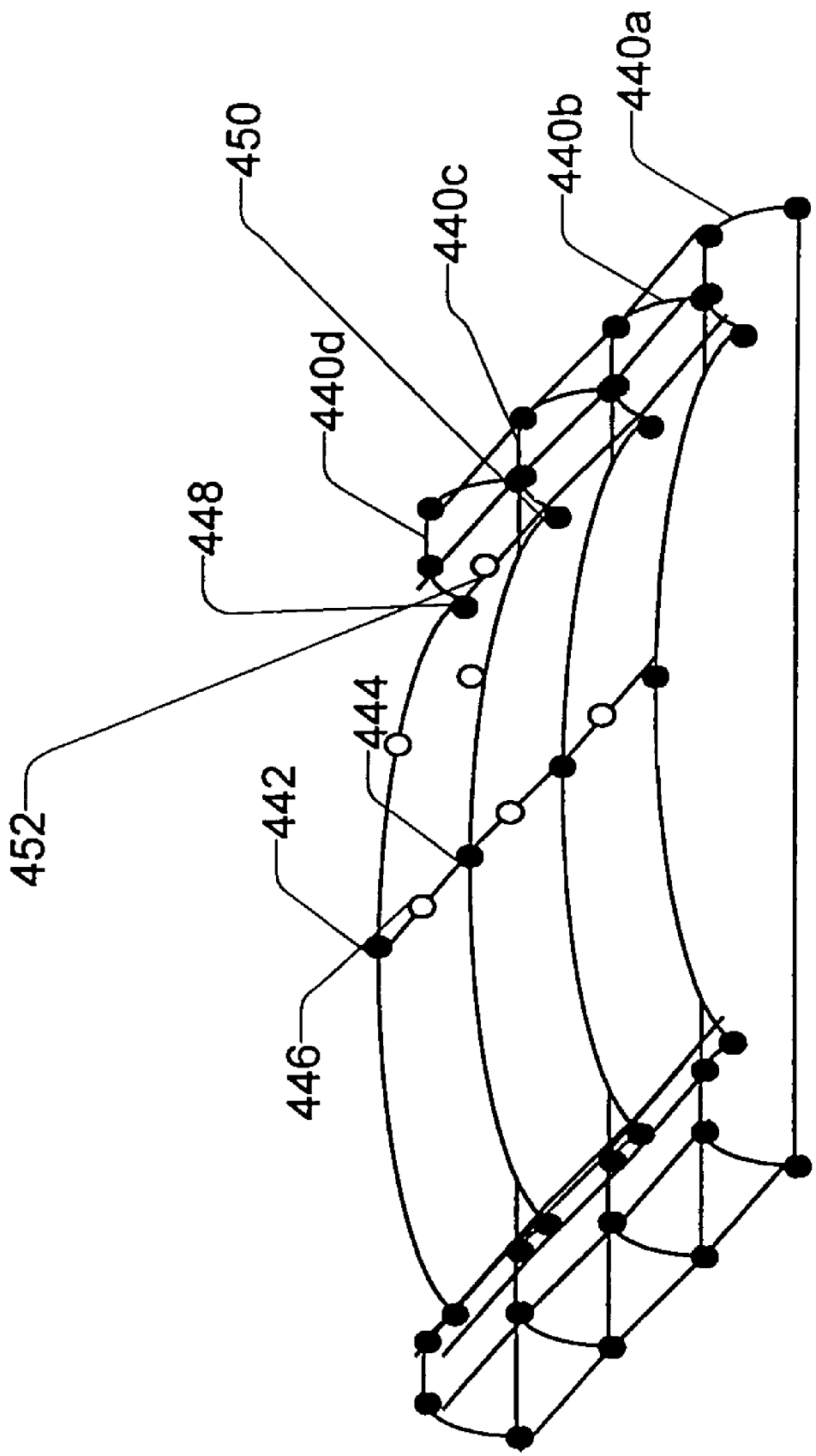
FIG. 4c is a block diagram depicting using a plurality of individual road profiles to generate a road in accordance with an exemplary embodiment of the present invention.

FIG. 4*c* is a block diagram depicting using a plurality of individual road profiles to generate a road in accordance with an exemplary embodiment of the present invention. A road may be generated using a plurality of road profiles to specify a set of points for a Bezier patch. A Bezier patch defines a curved surface in a manner similar to how a Bezier spline defines a curved line. A Bezier patch uses 16 points in a 4×4 grid, for example, to define a surface. A plurality of road profiles, such as road profiles 440*a*, 440*b*, 440*c*, and 440*d* may be used to specify a set of points for a Bezier patch in a variety of ways. For example, an inter road profile space 442 may be specified as a spacing between adjacent road profiles. Then, the points used to define the plurality of spaced apart road profiles may be used to specify a set of points for the Bezier patch. In the illustrated example, road profile points 444, 446, 448, and 450 are used to specify one side of a 4×4 grid and road profile points 450, 452, 454, and 456 are used to specify another side of the 4×4 grid. In addition, additional points may be generated through interpolation between the road profiles, such as point 458, if a finer mesh is desired for defining the Bezier patch.

Referring again to FIG. 2, the city model generation process associates (224) a subtype to each roadway described in the city model. To do so, the city model generation process uses zoning information about a city to determine a subtype. In addition, a photograph database 222 may be used to determine the subtype of a roadway as well. The photograph database includes photographs 225 of the actual city being modeled with the photographs being keyed to the longitudinal and latitudinal coordinates 227 of the city. These coordinates may be transformed into the same coordinate system as used for the grid points in the city model. From the types and numbers of objects depicted in the photographs, a subtype of the roadway can be determined.

Figure 5:
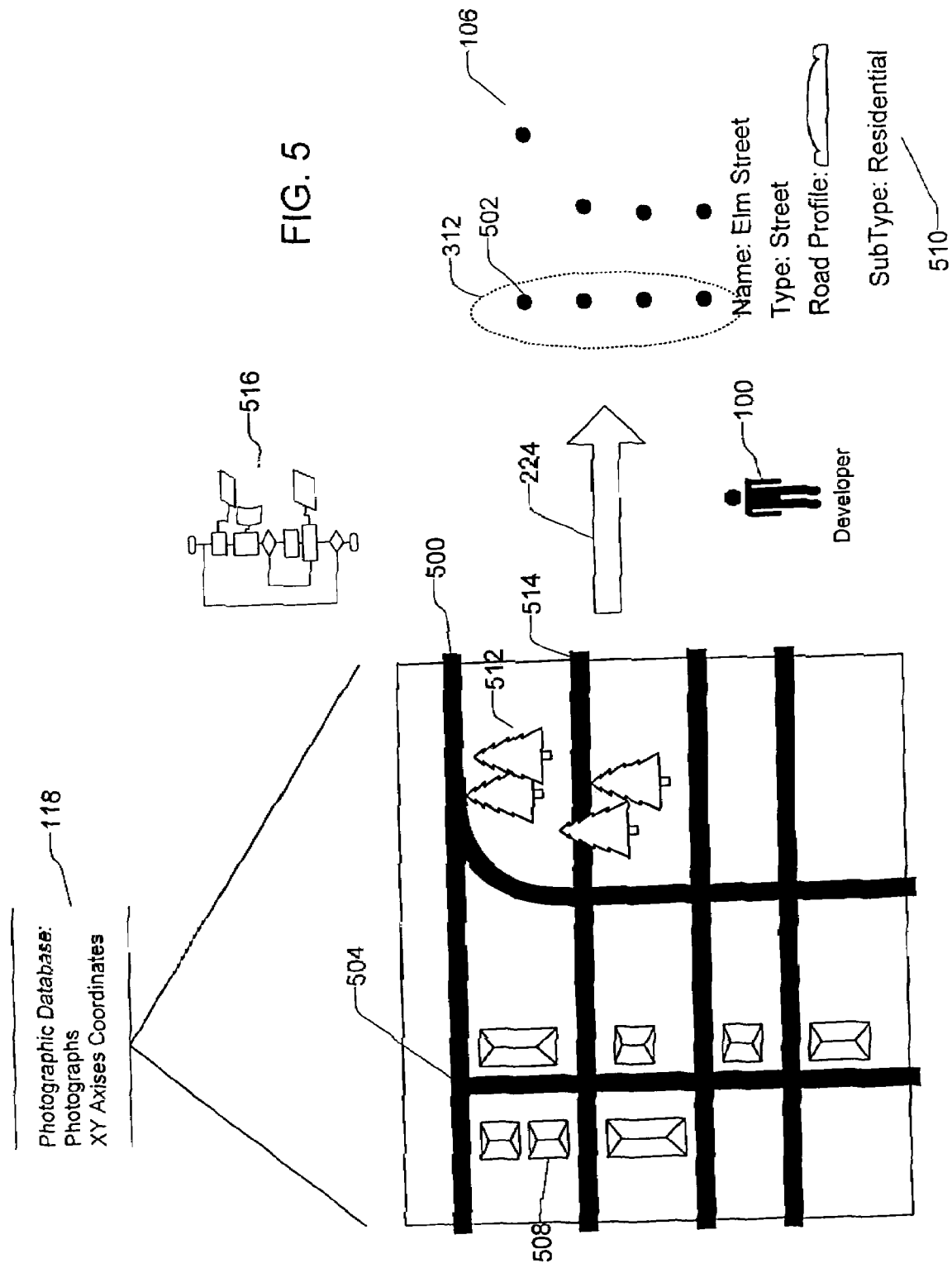
FIG. 5 is a block diagram depicting a roadway subtyping process in accordance with an exemplary embodiment of the present invention.

FIG. 5 is a block diagram depicting a roadway subtyping process in accordance with an exemplary embodiment of the present invention. In one roadway subtyping process in accordance with an exemplary embodiment of the present invention, the zoning statutes for the actual city are used to determine the subtype for a roadway. For example, if a roadway passes through an area of a city zoned only for single family residences, then the subtype of the roadway is set to "residential".

In another roadway subtyping process in accordance with an exemplary embodiment of the present invention, photographs, such as ariel photographs are used to determine the subtype of a roadway. A photograph database 118 includes a plurality of photographs, such as photograph 500, indexed using a coordinate system that may be transformed into a coordinate system used in a city model 106 For each grid point in the city model, such as grid point 502, there is a corresponding location in a photograph in the photograph database, such as location 504 in photograph 500. By examining the photograph at a location corresponding to a grid point from a roadway's set of grid points, such as grid point set 312, a subtype for the roadway may be determined. For example, depicted in photograph 500 at location 504 is a plurality of single family dwellings 508 as seen from an ariel perspective. As such, it can be determined that the subtype of a roadway associated with grid point set 312 is "residential" 510. As another example, foliage is shown in picture 500 at location 512. Therefore, the subtype for a roadway 514 passing through location 512 may be set to "rural".

In one roadway subtyping process in accordance with an exemplary embodiment of the present invention, a software developer 100 examines the photographs to determine what subtype should be assigned to a roadway. In other roadway subtyping processes in accordance with exemplary embodiments of the present invention, a city model generation process includes a software facility 516 for examining a photograph and automatically generating a subtype for a roadway.

Referring again to FIG. 2, a city model generation process generates (227) Z axis coordinates or elevations for a city model using a topographic database 228. The topographic database includes topographic city information including Z axis information 229 associated with X and Y axis coordinates 230 corresponding to locations with the actual city being modeled. The X and Y axis coordinates may be transformed into X and Y axis coordinates in the city model and then Z axis values may be associated with the transformed X and Y axis coordinate values.

Figure 6:
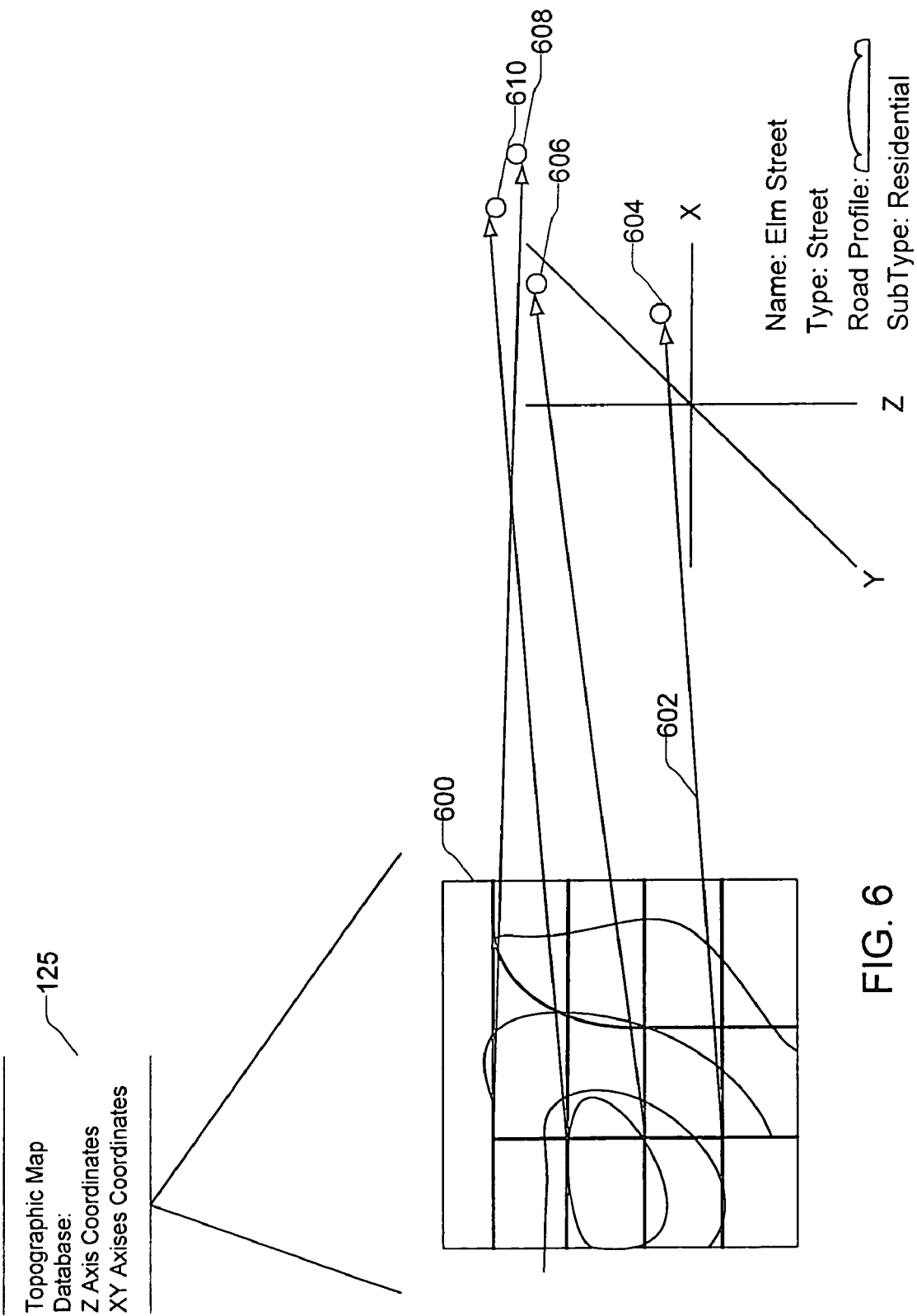
FIG. 6 is a block diagram of a Z axis coordinate generation process in accordance with an exemplary embodiment of the present invention.

FIG. 6 is a block diagram of a Z axis coordinate generation process in accordance with an exemplary embodiment of the present invention. A Z axis coordinate generation process uses a topographic map 600 included in a topographic database 228 to map (602) Z coordinate values from the topographic map to grid points, such as grid point 604, included in the city model. The mapping is done for each of the grid points, such as grid points 606, 608, and 610, in a set of grid points associated with a roadway in the city model. In this way, a complete elevation of a roadway along its entire length can be specified.

Referring now to FIG. 2, a city model generation process associates (230) generic feature models to a city model using a generic feature database 232. Included in the generic feature database are models of buildings and other features of a generic nature such as a model depicting a generic buildings and vegetation.

Figure 7:
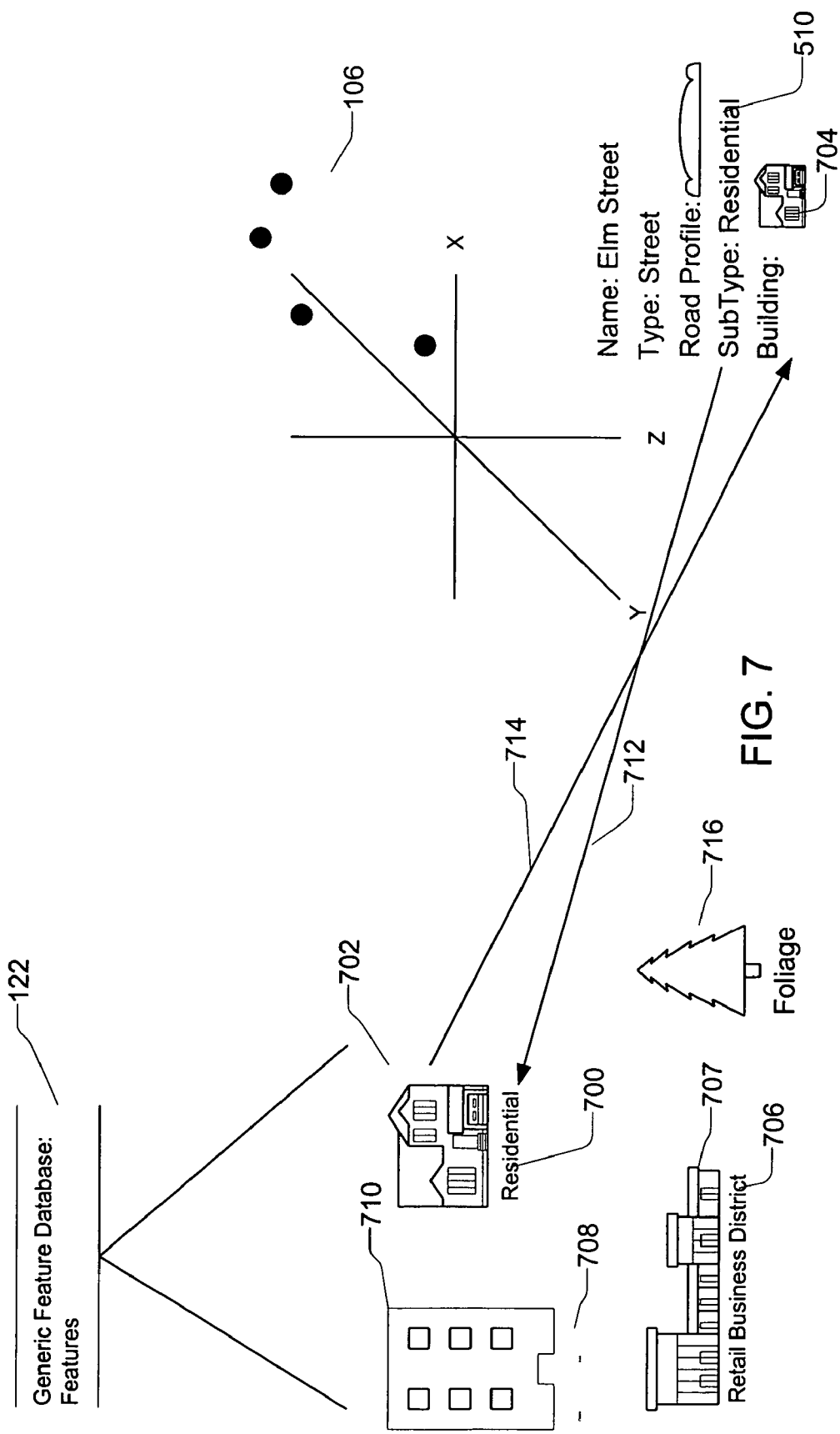
FIG. 7 is a generic feature association process in accordance with an exemplary embodiment of the present invention.

FIG. 7 is a generic building association process in accordance with an exemplary embodiment of the present invention. A generic feature database 122 includes subtypes, such as subtype 700, associated with models of features, such as building model 702, that may be representative of features that would be expected to be found along a roadway having a particular subtype. For example, a roadway having a "residential" subtype 510 would have dwellings 704 alongside the roadway. In a similar manner, a roadway having a "retail business district" subtype 706 would have stores 707, a roadway having a "downtown" subtype 708 would hive high-rise buildings 710 alongside it, etc. The generic building association process examines the subtype 510 of a roadway and selects (712) a building to associate (714) with the roadway in the city model 106.

In one embodiment of a feature association process in accordance with an exemplary embodiment of the present invention, a plurality of different building models are associated in the generic feature database with a single subtype. In this building association process, buildings are selected at random for association with the roadway and different points along the roadway. In this way, randomness is introduced into the city model to better model the appearance of the actual city being modeled.

In another embodiment of a feature association process in accordance with an exemplary embodiment of the present invention, the subtype is used to trigger a set of rules for associating features with a roadway. For example, a rule may specify the ratio of buildings to open spaces allowed along the roadway or specify a sequence of buildings and other features that may repeated.

Referring now to FIG. 2, a city model generation process associates (234) landmarks models stored in a landmark database 124. Landmarks are buildings or other distinctive features that are well known within the actual city being modeled and an accurate representation of the actual city would be obviously incomplete without the landmark. An exemplary landmark is the Empire State Building in New York City, USA.

Figure 8:
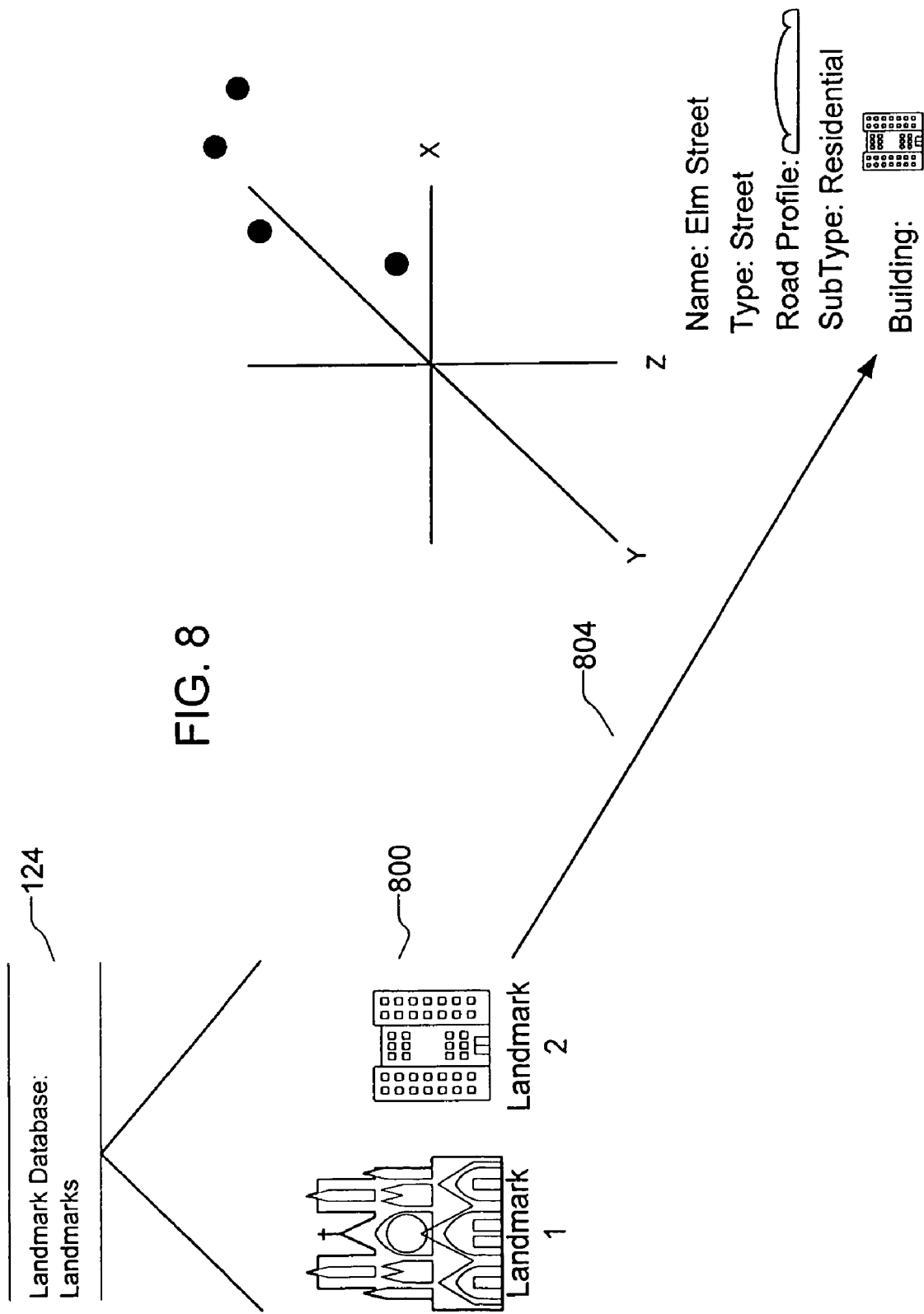
FIG. 8 is a landmark association process in accordance with an exemplary embodiment of the present invention.

FIG. 8 is a landmark association process in accordance with an exemplary embodiment of the present invention. A landmark association process uses a landmark database 124 including models of landmark buildings, such as landmark building 800. The landmark buildings are placed into the city model by associating (804) the landmark building model to a roadway. The landmark building models may be generated from a set of customizable building rules or may be generated by an artist in an essentially hand-made generation mode.

Referring now to FIG. 2, when the city model generation process has completed the city model, the city model is stored for later use in a software application. The software application uses the stored city model 204 to generate views of the simulated city in accordance with user inputs.

Figure 9:
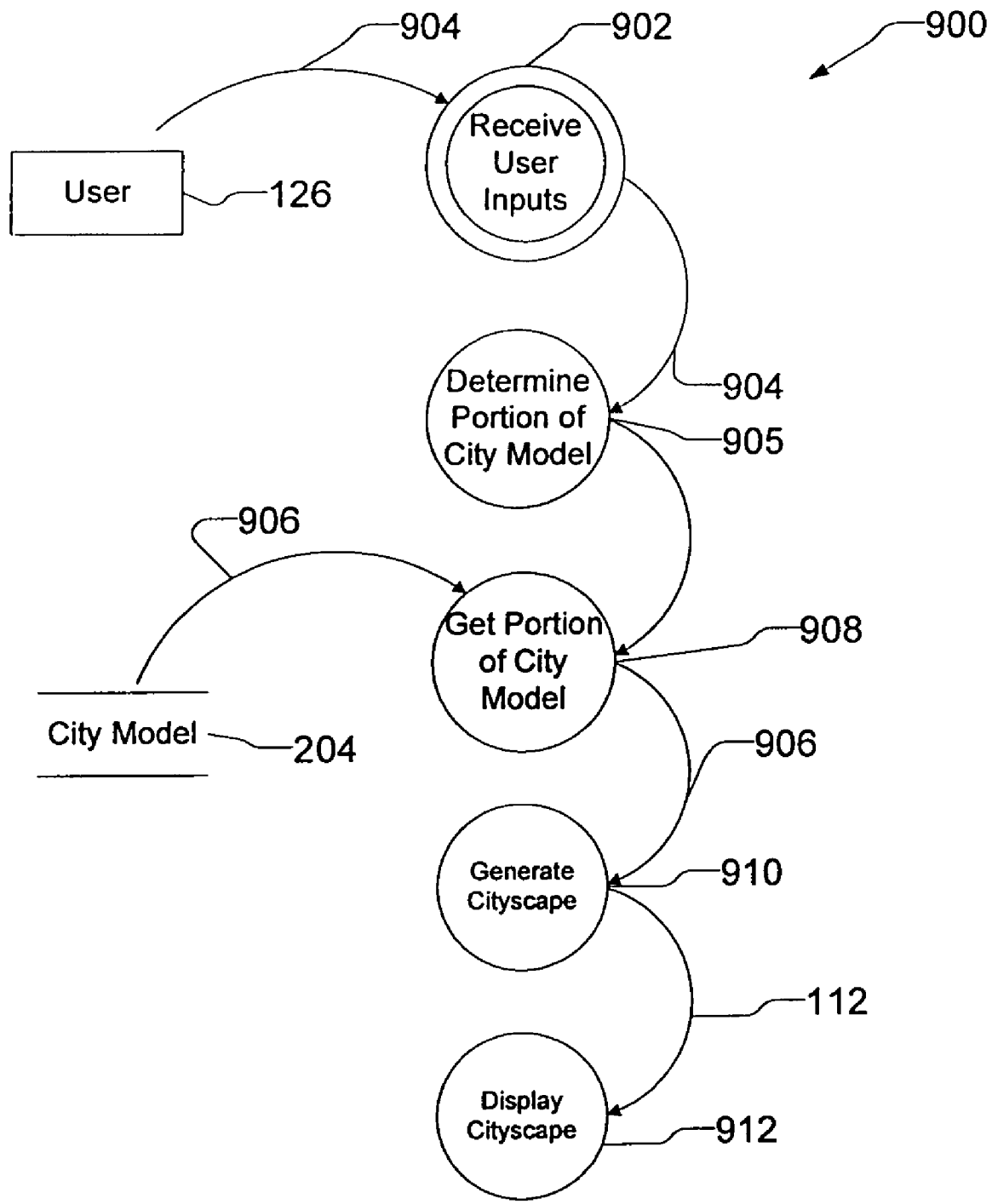
FIG. 9 is a data flow diagram of a cityscape generation process in accordance with an exemplary embodiment of the present invention.

FIG. 9 is a data flow diagram of a cityscape generation and display process in accordance with an exemplary embodiment of the present invention. A display generation process 900 receives (902) user inputs 904 from a user 126. The user inputs may be in the form of command sequences instructing the cityscape generation process to generate incrementally updated views of a stored city model 204. For example, in a video game format, the incrementally updated cityscapes are used to simulate driving through the simulated city along the simulated city's roadways.

The display generation process uses the user inputs to determine (905) which portion 906 of the city model to get (908) from the stored city model. The display generation process uses the portion of the city model to generate (910) a cityscape 112 which is then displayed (912) to the user using a display device. The process is repeated continuously to generate a dynamic view of the simulated city in response to the user inputs.

In one city model generation process in accordance with the present invention, the city model is stored is a set of grid points as previously described. Included with the grid points are control points allowing the grid points to be used to generate Bezier patches which are used to generate curved surfaces. These curved surfaces and then tessellated to generate polygons which are then used along with surface textures to generate the cityscape.

Figure 10:
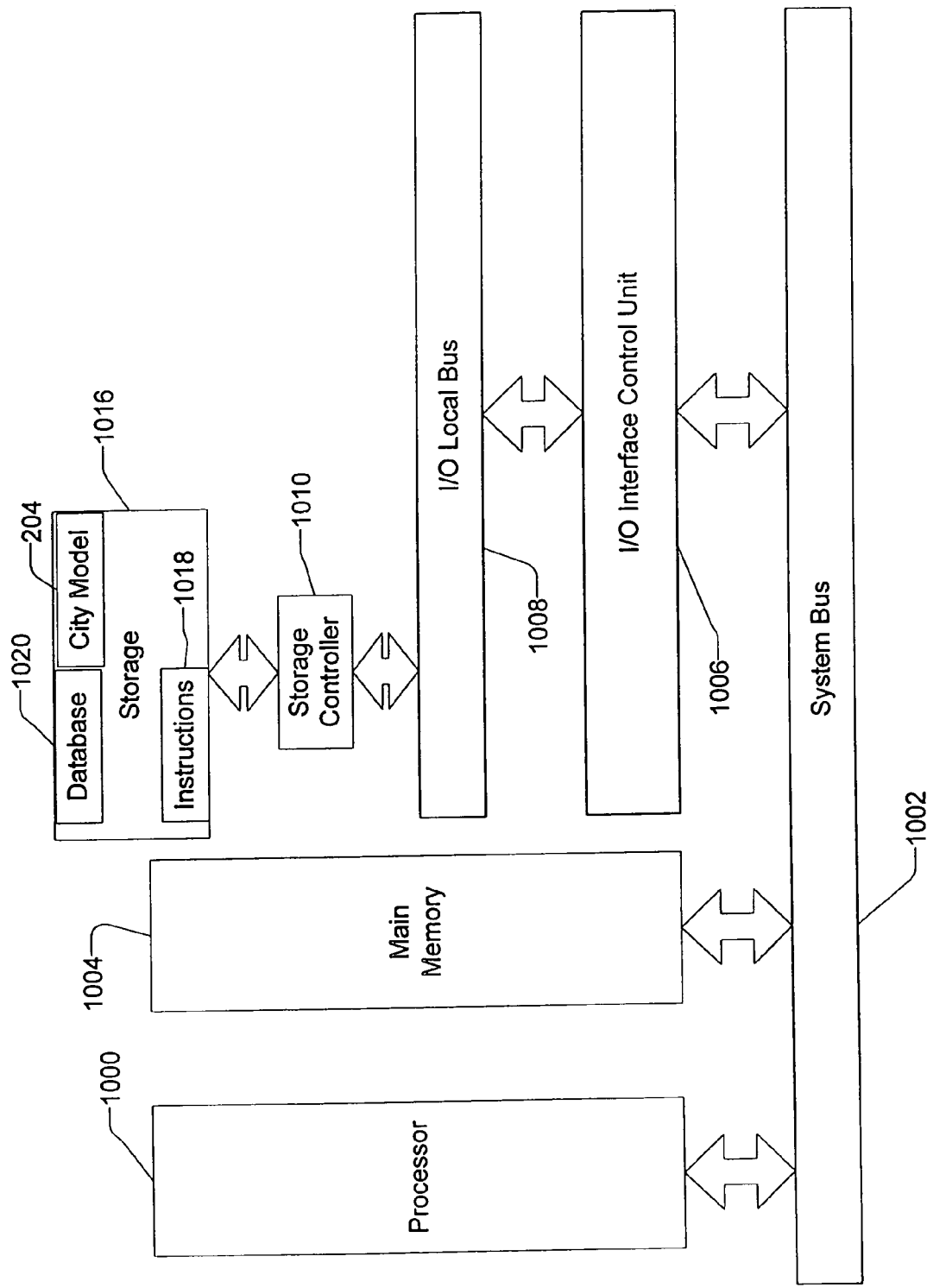
FIG. 10 is a hardware architecture diagram of a data processing system suitable for use as a city model generator host in accordance with an exemplary embodiment of the present invention.

FIG. 10 is a hardware architecture diagram of a data processing system suitable for use as a city generator host in accordance with an exemplary embodiment of the present invention. A data processing system includes a processor 1000 operatively coupled via a system bus 1002 to a main memory 1004 and an I/O interface control unit 1006. The I/O interface control unit is operatively coupled via an I/O local bus 1008 to a storage controller 1010.

The storage controller is operatively coupled to a storage device 1016. Computer program instructions 1018 implementing a simulated city generator are stored on the storage device until the processor retrieves the computer program instructions and stores them in the main memory. The processor then executes the computer program instructions stored in the main memory to implement the previously described simulated city generator.

The storage device further includes storage locations for the previously described city information databases 1120 used by the simulated city generator to generate a stored city model 204. Once generated, the city model is stored on the storage device for later use or incorporation into a software application.

Figure 11:
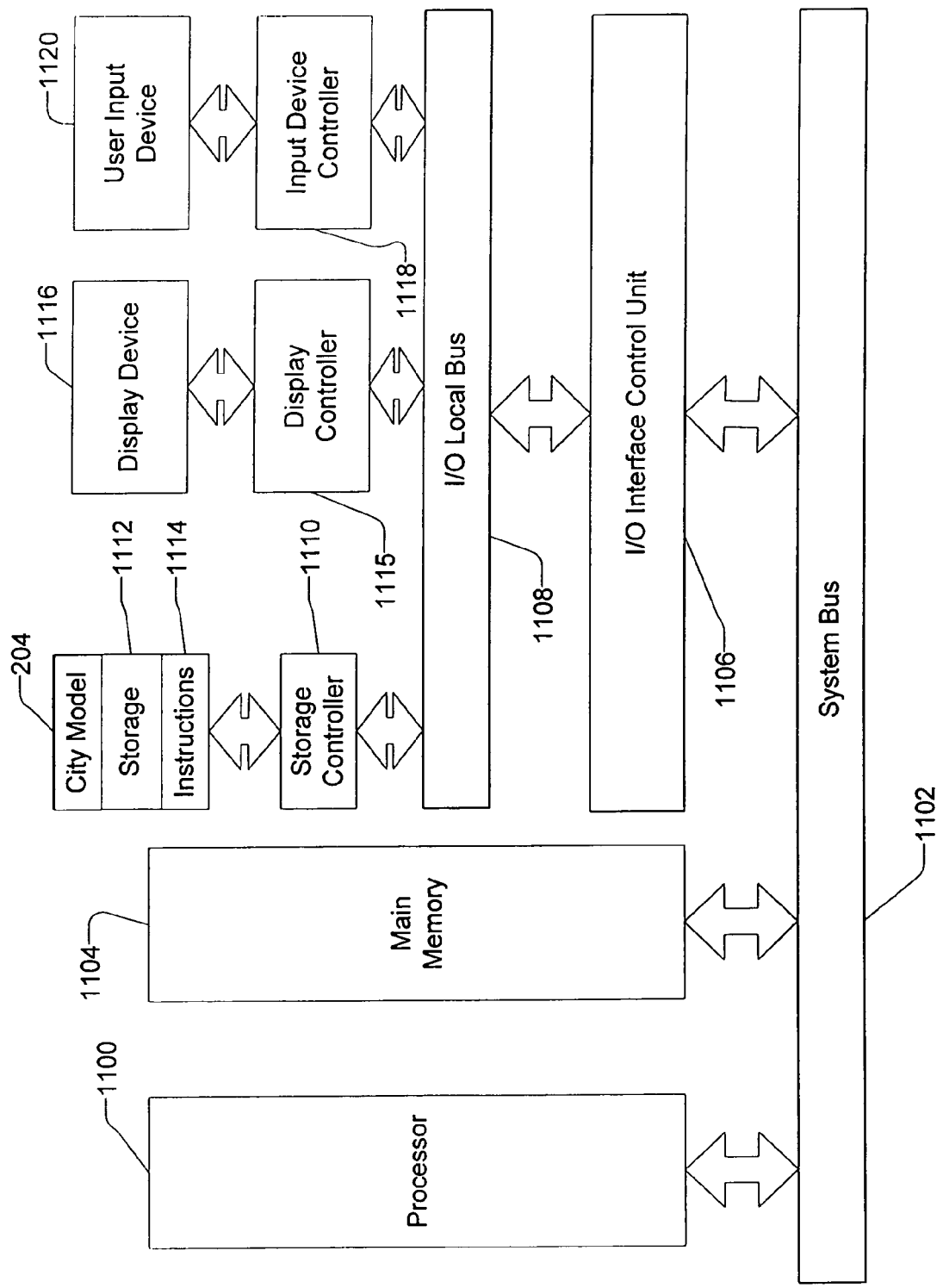
FIG. 11 is a hardware architecture diagram of a data processing system suitable for use as a cityscape generator host in accordance with an exemplary embodiment of the present invention.

FIG. 11 is a hardware architecture diagram of a data processing system suitable for use as a cityscape generator host in accordance with an exemplary embodiment of the present invention. A data processing system includes a processor 1100 operatively coupled via a system bus 1102 to a main memory 1104 and an I/O interface control unit 1106. The I/O interface control unit is operatively coupled via an I/O local bus 1108 to a storage controller 1110. The storage controller is operatively coupled to a storage device 1112. Computer program instructions 1114 implementing a cityscape generator are stored on the storage device until the processor retrieves the computer program instructions and stores them in the main memory. The processor then executes the computer program instructions stored in the main memory to implement a previously described cityscape generator to generate cityscapes using a city model 204 stored on the storage device.

The I/O interface control unit is further coupled to a display device controller 1115 that is also coupled to a display device 1116. The processor generates cityscape display signals using the computer instructions and transmits them to the display controller. The display controller uses the cityscape display signals to control the operations of the display device in order to display the cityscape to the user.

The I/O interface control unit is further coupled to a user input device controller 1118 that is also coupled to a user input device 1120. A user uses the user input device to generate user input signals that are received by the user input controller and transmitted to the cityscape generator implemented by the processor. The cityscape generator uses the user input signals to determine which portions of the city model should be retrieved from the storage device and used to generate a cityscape for display to the user.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents.

What is claimed is:

1. A method of generating a city model, comprising:
receiving a set of roadway segments, the roadway segments corresponding to a plurality of roadways of a city;
generating a set of grid points using the set of roadway segments, the grid points corresponding to intersections between the roadway segments;
associating a feature model to each subset of the set of grid points, each subset of the set of grid points corresponding to at least a portion of a roadway of the plurality of roadways of the city, the feature model representative of buildings expected to be found along each roadway segment.

2. The method of claim 1, further comprising:
associating a type to a subset of the set of grid points, the subset corresponding to a roadway from the plurality of roadways; and
associating a road profile to the subset of grid points using the type.

3. The method of claim 1, wherein associating a feature model further includes using a photograph of a portion of the city to be simulated corresponding to an area through which each roadway segment passes to determine buildings expected to be found along each roadway segment.

4. The method of claim 1, wherein associating the feature model further includes using zoning information for the city to be simulated to determine the feature model.

5. The method of claim 1, further comprising associating a model of a landmark to the subset of the set of grid points corresponding to the roadway segment where the landmark is located.

6. A data processing apparatus for generating a city model, comprising:
a processor; and
a memory coupled to the processor, the memory having program instructions executable by the processor stored therein, the program instructions including program instructions for: receiving a set of roadway segments, the roadway segments corresponding to a plurality of roadways of a city;
generating a set of grid points using the set of roadway segments, the grid points corresponding to intersections between the roadway segments;
associating a feature model to each subset of the set of grid points, each subset of the set of grid points corresponding to at least a portion of a roadway of the plurality of roadways of the city, the feature model representative of buildings expected to be found along each roadway segment.

7. The data processing apparatus of claim 6, the program instructions further including:
associating a type to a subset of the set of grid points, the subset corresponding to a roadway from the plurality of roadways; and
associating a road profile to the subset of grid points using the type.

8. The data processing apparatus of claim 6, wherein the instructions for associating feature models further includes instructions for using zoning information for the city to be simulated to determine the feature model.

9. The data processing apparatus of claim 6, the instructions further including instructions for associating model of a landmark to the subset of the set of grid points corresponding to the roadway segment where the landmark is located.

10. A method of computer generating a cityscape using a city model data to form a computer-generated three dimensional model corresponding to actual city parameters, comprising:
generating a roadway connectivity model using road profiles from the city model;
applying elevation information from the city model to the roadway connectivity model to obtain an elevated roadway connectivity model; and
using feature models from the city model to generate buildings associated with each roadway in the elevated roadway connectivity model.

11. The method of claim 1, further comprising; receiving topographic information for the city; and associating elevation values to the grid points using the topographic information.

12. The data processing apparatus of claim 6, the program instructions further including instructions for:
receiving topographic information for the city to be simulated; and
associating elevation values to the rid points using the topographic information.

13. A method of generating a display information for roadside depictions in a video game, comprising:
representing a roadway by a set of grid points;
determining building types along portions of the roadway by using zoning information; and
associating the building types with the portions of the roadway.

* * * * *

UNITED STATES PATENT AND TRADEMARK OFFICE
CERTIFICATE OF CORRECTION

| | | |
|---|---|---|
| PATENT NO. | : 7,707,012 B2 | |
| APPLICATION NO. | : 10/850455 | |
| DATED | : April 27, 2010 | |
| INVENTOR(S) | : Adrian Stephens | |

It is certified that error appears in the above-identified patent and that said Letters Patent is hereby corrected as shown below:

Col. 10, Line 19, in claim 9, delete "associating model" and insert --associating a model--, therefor.

Col. 10, Line 23, in claim 10, after "model" delete "data".

Col. 10, Line 42, in claim 12, delete "rid" and insert --grid--, therefor.

Signed and Sealed this
Seventeenth Day of May, 2011

David J. Kappos
*Director of the United States Patent and Trademark Office*